UNITED STATES PATENT OFFICE.

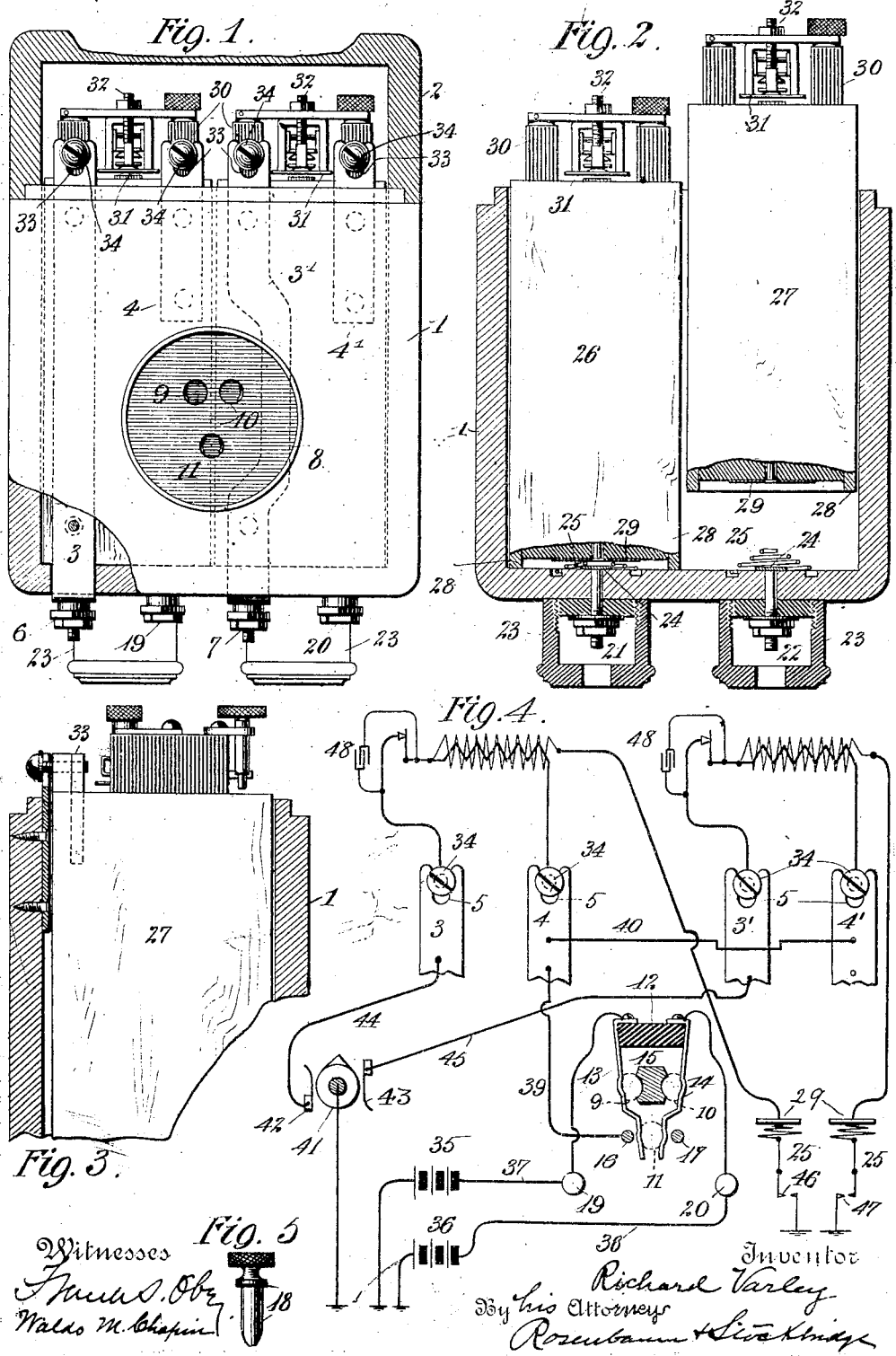

RICHARD VARLEY, OF ENGLEWOOD, NEW JERSEY, ASSIGNOR TO THE AUTOCOIL COMPANY, A CORPORATION OF NEW JERSEY.

INDUCTION-COIL.

No. 878,435.

Specification of Letters Patent.

Patented Feb. 4, 1908.

Application filed February 8, 1905. Serial No. 244,720.

*To all whom it may concern:*

Be it known that I, RICHARD VARLEY, a citizen of the United States, residing at Englewood, in the county of Bergen and State of New Jersey, have invented certain new and useful Improvements in Induction-Coils, of which the following is a full, clear, and exact description.

This invention relates to induction coils adapted for ignition circuits of explosion motors used for propelling automobiles and motor boats.

The object of the invention is to provide an apparatus of simple construction, easily and quickly manipulated and which will occupy but small space and will not be liable to get out of order.

Some features of my improvements relate to multiplex coils or to a number of coils adapted for a multiple cylinder engine and to the housing of such coils in a single box from which they can be readily removed and replaced without liability of deranging the circuits.
Other features of improvement have to do with the construction of a single coil.

The invention consists of the details of construction which will be hereinafter described and claimed.
In the accompanying drawings: Figure 1 is a front elevation of a two-coil or two-unit box with parts in section; Fig. 2 is an irregular vertical section of the casing and its attachments, showing one of the coils displaced; Fig. 3 is a section of a part of the casing and elevation of one of the coil casings illustrating the mechanical and electrical connection; Fig. 4 is a diagram of the circuits, and Fig. 5 is a view of a switch plug.
Referring to the drawings by numerals of reference, 1 is a box having a cover 2. This box, as comprehended by this invention, may be of any size to accommodate any number of independent induction coils with their attachments. As illustrated, it is adapted to receive two of the coil units and these are supposed to be used in connection with a two-cylinder explosion engine. The box is rectangular in shape, its body portion being adapted to receive the coil casings and its cover to house the vibrators attached to one end of the coil casings.

On the inside of the front wall of the box are attached two strong metal strips 3 and 4, respectively, for each coil casing, the second set of strips for the second coil casing being indicated by 3' and 4'; these project above the body portion of the box slightly and are there formed with notches 5 for the entrance of fastening screws, as will be hereinafter described. The opposite ends of strips 3, 3', etc., project through slots in the bottom of the box and are bent at right angle against the exterior of the bottom to receive binding posts 6 and 7. Against the front of the box is fixed a metal plate 8, having three plug holes 9, 10 and 11, respectively, to receive a metal plug illustrated in Fig. 5. Behind this plate is attached an insulating block 12, shown conventionally in Fig. 4, which carries two metal springs 13 and 14.

15, 16 and 17 indicate integral projections from the back of plate 8, so shaped and located that when the plug 18 of Fig. 5 is inserted in the hole 9, spring 13 will be connected with the plate and when the plug is inserted in the hole 10, spring 14 will be connected with the plate and when the plug is inserted in the hole 11, both springs will be connected with the plate by contact with the parts 16 and 17. To the bottom of the box 1 are attached binding posts 19 and 20, and other binding posts 21 and 22, one for each coil unit, are attached to the bottom of the box and housed within non-conducting protecting covers 23. These last mentioned binding posts have stems passing through the bottom of the box and terminating in metal plates 24 to which are fastened spiral springs 25.

The two coil units contained in the casing are indicated by 26 and 27 and as these are counterparts of each other, a description of one will suffice. The induction coils consist of the usual primary and secondary windings located upon an iron core. These windings and the core are contained within rectangular boxes 28 each having secured to its bottom a metal plate 29 in position to rest upon the spring 25 when the unit is passed into the box 1. This plate 29 connects interiorly with one end of the secondary winding. On the opposite or upper end of box 28, is fitted a frame 30 containing a vibrator 31 of any suitable construction and a contact screw 32 for making and breaking the primary circuit. Attached to each box 28 are two strong metal lugs 33, to one of which one end of the primary winding leads while the other is electrically connected with the vibrator. Each of these posts carries a screw 34 projecting forward and in a position to pass into the notch at the upper ends of the respective strips 3, 4, the forked portion of the strips passing behind the head of the screw. In this way the coil box is mechanically held firmly in the box 1 and at the same time two of the electrical connections which it is necessary to perfect when the coil is inserted in the box, are made automatically or simultaneously. In assembling the various coil units in the box, they are placed therein one at a time, the screw 34 of each coil box being dropped into the notches of the corresponding strips attached to the box 1 and the plates 29 at the bottom of the coil box coming naturally into contact with the springs 25. When the screws 34 are set up tightly, all of the units are firmly held in the box and cannot be displaced by ordinary disturbances. The resiliency of springs 25 is such that good electrical contact will always be maintained between plates 24 and 29, regardless of slight variations of position of the coil boxes and also regardless of any vibration to which the boxes may be subjected.

The function of plate 8 and the parts connected with it, is that of an electric switch and it is here used to bring into action either one or both of two batteries. In operating automobiles, it often happens that one battery will become exhausted at a time when the vehicle is out of reach of another, so it is customary to carry at least two batteries at a time and the switch herein described is used for throwing either battery into service at will, and when neither one alone is capable of yielding the amount of current required, they can both be thrown into use to obtain their added electromotive forces. The operation of this switch as well as the circuits involved in my apparatus, will now be described in connection with Fig. 4.

The two batteries are indicated by 35 and 36. One side of each of them is "grounded," to the frame of the machine, while the other sides lead respectively by wires 37 and 38 to the binding posts 19 and 20. From these posts other wires run to the respective springs 13 and 14. Plate 8 connects with strip 4 by means of wire 39 and the two plates 4 and 4' are connected together by wire 40.

41 indicates a cam on the engine shaft capable of making contact during its rotation with two springs 42 and 43. Spring 42 connects by wire 44 with strip 3, while spring 43, connects by wire 45 with strip 3'. Posts 21 and 22 represented in the diagram by springs 25, connect with one side of the ignition plugs 46 and 47 in the respective cylinders of the engine, the opposite sides of each plug being grounded. Assuming the plug 18 to be inserted between the spring 13 and the projection 15 of the plate 8, it will be seen that when the cam 41 engages spring 42, the circuit will be closed through the primary of one induction coil and the battery 35, as follows: From ground or frame to cam 41, contact 42, wire 44, strip 3, primary winding and vibrator, strip 4, wires 39, plate 8, plug 18, spring 13, wire 37 and battery 35 to ground. When the cam strikes spring 43, the primary of the other induction coil is connected in circuit with the same battery 35, as can be readily traced over the wires 45 and 40. At each passage of current through the primary winding of a coil, a series of sparks occurs at the plug 46 or 47, due to the induced current in the secondary. When battery 35 has been so far consumed as not to supply the required current, plug 18 is shifted to the hole 10, thus connecting spring 14 with plate 8. It will now be seen that when either of the springs 42 or 43 is touched by the cam, the current flowing over wire 39, will pass to the spring 14 and thence to battery 36, battery 35 being cut out. If both batteries become weak and their combined forces are necessary to perform the work, the plug is inserted in the hole 11 and then when either of the springs 42 or 43 is touched by the cam, the current flowing through wire 39 will come from both batteries 35 and 36 by way of both springs 13 and 14, projections 16 and 17 and plug 18.

48 indicates the condensers bridging across the vibrators in the usual manner. I am aware that a switch capable of accomplishing the same purpose with respect to one or two batteries, has been used in connection with induction coils, but I claim herein the novelty of construction of the switch described.

The provision of the strips 3 and 4 in box 1 is a valuable feature of construction, because they furnish a solid support for the coil units and serve to electrically, as well as mechanically, connect them with the box and circuits, the mere act of properly adjusting the screws to the notched ends of the strips, automatically serving to bring and maintain the plate 29 and spring 25 into working connection to establish the secondary circuit.

Having described my invention, I claim:—

1. The combination of a box having secured to its wall two metallic strips, forming part of an electric circuit, and an induction coil unit provided with means for mechanical and electrical engagement with said strips.

2. The combination of a box having two metallic strips attached to one of its walls and each provided with a notch in its end, an exterior binding post carried by one of said strips, and an induction coil unit having two electrical terminals in the form of binding devices adapted to engage the notches in the respective strips to mechanically sustain the coil in the box and electrically connect it with circuits.

3. The combination of a box having a plurality of strips secured to one of its walls, said strips projecting through the bottom of the box and carrying binding posts and projecting above said wall and a plurality of induction coil units having metallic fastening devices adapted to engage said projecting strips and serving to mechanically sustain the coil units and electrically connect them in circuit.

4. In combination, a box or frame, a plurality of induction coils mounted therein, individual mechanical and electrical connections for each coil whereby any one of them may be removed without disturbing the connections of the others, and a single switch for controlling the primary current to all the coils.

5. In combination, a box or frame, a plurality of induction coils mounted therein, individual connections for the primary winding of each coil, means whereby any coil can be removed from the box or frame without disturbing the primary connections of the other coils, and a single switch for controlling the primary current to all the coils.

6. In an ignition system, the combination of a box or frame, a plurality of induction coils mounted therein and independently removable therefrom, a source of electricity common to all the primary windings of said induction coils electrical connections established by the mounting of a coil in the box or frame to connect its primary coil in circuit with said source of electricity, and independent circuit connections whereby the removal of a coil from the box or frame will not affect the electrical connections to the other coils.

7. In an ignition system, the combination of a box or frame, a plurality of induction coils mounted therein and independently removable therefrom, a source of electricity common to all the primary windings of said induction coils, firing devices external to said box or frame, electrical connections established by the mounting of a coil in the box or frame to connect its primary coil in circuit with said source of electricity and its secondary coil in circuit with said firing devices, and independent circuit connections whereby the removal of a coil from the box or frame will not affect the electrical connections to the other coils.

8. In an ignition system, the combination of a box or frame, a plurality of induction coils mounted therein and independently removable therefrom, two electrical contacts permanently fixed in the box or frame for each induction coil, and means for mechanically fastening each coil in the box which means also comprises electrical connections between the terminals of the primary windings and a pair of said contacts, one of each pair of said contacts being electrically connected together.

9. In an ignition system, the combination of a box or frame, a plurality of induction coils mounted therein and independently removable therefrom, two electrical contacts permanently fixed in the box or frame for each induction coil, means for mechanically fastening each coil in the box, which means also comprises electrical connections between the terminals of the primary windings and a pair of said contacts, one of each pair of said contacts being electrically connected together, and a third contact on the box or frame for each coil corresponding to a terminal of the secondary winding of each coil so arranged as to be maintained in connection with each other by said means for mechanically fastening each coil in the box or frame.

10. In an ignition system, the combination of a box or frame, a plurality of induction coils mounted therein and independently removable therefrom, a pair of electrical contacts permanently fixed in the box or frame for each induction coil, means for connecting the terminals of the primary windings of each coil with two of said contacts, one each of said pairs of contacts being electrically connected together within or upon said box or frame and to one pole of a source of electricity, and a switch adapted to connect the other contacts successively with the other pole of said source of electricity.

11. In an ignition system, the combination of a box or frame, a plurality of induction coils mounted therein and independently removable therefrom, a pair of electrical contacts permanently fixed in the box or frame for each induction coil, means for connecting the two terminals of the primary winding of each coil with the members of its respective pair of contacts, one member of each of said pairs of contacts being electrically connected together within or upon said box or frame, and to one pole of a source of electricity, and a switch adapted to connect the other member of each pair of contacts successively with the other pole of said source of electricity.

12. In an ignition system, the combination of a box or frame, a plurality of induction coils mounted therein and independently removable therefrom, a pair of electrical contacts permanently fixed in the box or frame for each induction coil, means for connecting the two terminals of the primary winding of each coil with the members of its respective pair of contacts, one member of each of said pairs of contacts being electrically connected together within or upon said box or frame, and to one pole of a source of electricity, a switch adapted to connect the other member of each pair of contacts successively with the other pole of said source of electricity, and means whereby the secondary winding of each coil is connected in circuit automatically when the terminals of the primary are connected.

13. In a spark coil for multiple cylindered gas or vapor engines, an outer case containing separate insertible sparking elements, one for each cylinder, and each having a suitable vibrator upon one end, and the electrical connections at or near the other end, some of which connections protrude through the case and are provided for external connection thereon, substantially as shown and described.

14. In combination with a spark coil and electric circuit thereto, a primary switch which in a certain position connects one source of electric energy to the coil, and in a certain other position connects two sources of electrical energy conjointly to the coil, substantially as and for the purpose set forth.

15. In combination with a sparking coil for gas engine, the electric current thereof supplied by batteries, an electric switch, one position of which shall complete the electric circuit of one battery singly, and in one position shall complete the circuit for two batteries conjointly, substantially as shown and described.

16. In combination with a sparking coil for gas engine, the electric current thereof which is supplied by batteries, a plug switch, one position of which shall complete the electric circuit of one battery singly, and in one position shall complete the circuit for two batteries conjointly, substantially as shown and described.

17. In combination with a spark coil and battery circuit thereof, a plug switch containing three or more plugging holes, two each connecting a single circuit independently, and one connecting two circuits in multiple thereof, substantially as and for the purpose set forth.

In witness whereof, I subscribe my signature, in the presence of two witnesses.

RICHARD VARLEY.

Witnesses:
FRANK S. OBER,
WALDO M. CHAPIN.

---

DISCLAIMER.

878,435.—*Richard Varley*, Englewood, N. J. INDUCTION-COIL. Patent dated February 4, 1908. Disclaimer filed March 19, 1908, by assignee.

Enters this disclaimer—

"To the following claims appearing in said Letters Patent, to wit:

"13. In a spark-coil for multiple-cylindered gas or vapor engines, an outer case containing separate insertible sparking elements, one for each cylinder, and each having a suitable vibrator upon one end, and the electrical connections at or near the other end, some of which connections protrude through the case and are provided for external connection thereon, substantially as shown and described.

"14. In combination with a spark-coil and electric circuit thereto, a primary switch which in a certain position connects one source of electric energy to the coil, and in a certain other position connects two sources of electrical energy, substantially as and for the purpose set forth.

"15. In combination with a sparking coil for gas-engine, the electric current thereof supplied by batteries, an electric switch, one position of which shall complete the electric circuit of one battery singly, and in one position shall complete the circuit for two batteries conjointly, substantially as shown and described.

"16. In combination with a sparking coil for gas-engine, the electric current thereof which is supplied by batteries, a plug-switch, one position of which shall complete the electric circuit of one battery singly, and in one position shall complete the circuit for two batteries conjointly, substantially as shown and described.

"17. In combination with a spark-coil and battery-circuit thereof, a plug-switch containing three or more plugging-holes, two each connecting a single circuit independently, and one connecting two circuits in multiple thereof, substantially as and for the purpose set forth."—[*Official Gazette, March 31, 1908.*]